No. 646,822. Patented Apr. 3, 1900.
F. GALLOWAY.
WASTE PROOF FEED BOX.
(Application filed Apr. 7, 1898.)
(No Model.)
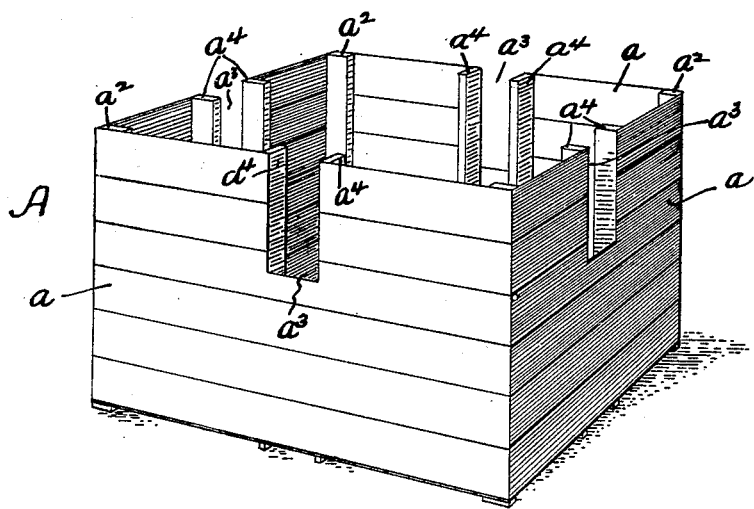
Witnesses.
Mahlon Purdin
Charles Strang
Inventor.
Frank Galloway

UNITED STATES PATENT OFFICE.

FRANK GALLOWAY, OF CENTRAL POINT, OREGON.

WASTE-PROOF FEED-BOX.

SPECIFICATION forming part of Letters Patent No. 646,822, dated April 3, 1900.

Application filed April 7, 1898. Serial No. 676,778. (No model.)

*To all whom it may concern:*

Be it known that I, FRANK GALLOWAY, a citizen of the United States, residing at Central Point, in the county of Jackson and State of Oregon, have invented certain new and useful Improvements in Waste-Proof Feed-Boxes, of which the following is a full, clear, and exact specification.

The object is in a ready, simple, and thoroughly-efficient manner to obviate waste and loss of provender in feeding stock; furthermore, to provide a feed-box in which the employment of yokes or stocks for keeping the animal's head in the box against backward movement will be obviated, thereby rendering unnecessary the employment of an attendant to manipulate such devices before and after the stock is fed.

The invention consists in a feed-box having a plurality of permanently-open-ended recesses, through which the animal while feeding thrusts its neck. These recesses are of such width as to permit the animal to move its head and neck with perfect freedom, but will prevent it from withdrawing its head from the box by a backward movement, the only way in which it can free itself being by rearing its head a sufficient height to clear the walls of the recesses. These recesses are reinforced by inwardly-projecting braces, secured to the inner surfaces of the box and extending parallel with the vertical walls of the recesses, so that should an animal try to withdraw its head these braces will in the case of cattle catch back of the horns and check the attempt. In the case of horses, sheep, or other stock these braces will catch back of the ears and in like manner prevent the withdrawal of the animal's head.

Further and more specific details of construction will be hereinafter fully described.

In the accompanying drawing, forming a part of this specification, and in which like letters of reference indicate corresponding parts, I have illustrated a form of embodiment of my invention, although it is to be understood that other forms thereof may be employed without departing from the spirit of the same, and in the drawing the figure is a view in perspective of my improved feed-box.

Referring to the drawing, A designates the box, which may be constructed of any material suited to the purpose—in this instance of boards $a$, secured to corner-uprights $a^2$. The bottom of the box (not shown) is secured in place in any preferred manner. Each side and end of the box is provided with a permanently-open-ended recess $a^3$, to be occupied by the neck of an animal when feeding, the transverse or lower wall of each recess being located at a height above the bottom of the box to allow the animal feeding readily to reach provender placed on said bottom and each recess being of a width to permit the animal freely to move its neck, but to prevent it from withdrawing its head from the box by a backward movement, thereby effectively preventing any waste of feed. In order to reinforce these recesses and at the same time present an additional obstruction to an animal's head in any attempt it may make to withdraw from the box while feeding, I provide on each side of each of these recesses inwarldy-projecting reinforcing-braces $a^4$, which may be of any desired width for the purpose.

The box described is constructed with a view to simplicity of arrangement and effectiveness of operation and to obviate the employment of yokes or stocks, as heretofore used in devices of this character.

While I have shown but one recess in each side and end of the box, it is to be understood that I do not limit myself to this particular number, as it may be increased without departing from the spirit of my invention.

Having thus fully described my invention, what I claim as new, and desire to secure by Letters Patent of the United States, is—

1. A waste-proof feed-box having its sides and ends provided with permanently-open-ended recesses, the transverse or lower wall of each recess being located at a height above the bottom of the box to allow the animal feeding readily to reach provender placed on such bottom, and each recess being of a width to permit the animal freely to move its neck, but to prevent it from withdrawing its head from the box by a backward movement, whereby waste of provender is effectively obviated, substantially as described.

2. A waste-proof feed-box having its sides and ends provided with permanently-open-ended recesses, the transverse or lower wall of each recess being located at a height above the bottom of the box to allow the animal feeding readily to reach provender placed on such bottom, and each recess being of a width to permit the animal freely to move its neck, but to prevent it from withdrawing its head from the box by a backward movement, whereby waste of provender is effectively obviated, and inwardly-extending braces, on the inner surfaces of the sides and ends of the box, and extending parallel with and contiguous to the vertical walls of the recesses, substantially as and for the purpose specified.

FRANK GALLOWAY.

Witnesses:
 MAHLON PURDIN,
 CHARLES STRANG.